United States Patent
Crawford, Jr.

(10) Patent No.: US 11,058,100 B1
(45) Date of Patent: Jul. 13, 2021

(54) OPEN FACE FISHING REEL WITH QUICK-RELEASE SPOOL

(71) Applicant: Jeff Crawford, Jr., Scottville, MI (US)

(72) Inventor: Jeff Crawford, Jr., Scottville, MI (US)

(*) Notice: Subject to any disclaimer, the term of this patent is extended or adjusted under 35 U.S.C. 154(b) by 3 days.

(21) Appl. No.: 16/429,766

(22) Filed: Jun. 3, 2019

Related U.S. Application Data

(60) Provisional application No. 62/679,394, filed on Jun. 1, 2018.

(51) Int. Cl.
    *A01K 89/01*     (2006.01)
    *A01K 89/015*     (2006.01)
    *A01K 89/016*     (2006.01)

(52) U.S. Cl.
    CPC ...... *A01K 89/01931* (2015.05); *A01K 89/016* (2013.01); *A01K 89/0192* (2015.05)

(58) Field of Classification Search
CPC .......... A01K 89/0111; A01K 89/01126; A01K 89/0113; A01K 89/0162; A01K 89/01931; A01K 89/03; A01K 89/058; A01K 89/059
See application file for complete search history.

(56) References Cited

U.S. PATENT DOCUMENTS

| | | | | |
|---|---|---|---|---|
| 2,865,662 A | * | 12/1958 | Nurmse | G05G 1/12 242/318 |
| 2,942,799 A | * | 6/1960 | Meulnart | A01K 89/0111 242/318 |
| 3,565,362 A | * | 2/1971 | Lilland | A01K 89/01 242/322 |
| 3,682,411 A | * | 8/1972 | Dumbauld | A01K 89/027 242/246 |
| 3,693,901 A | * | 9/1972 | Lilland | A01K 89/01 242/318 |
| 3,765,618 A | * | 10/1973 | Johnson | A01K 89/0192 242/317 |
| 4,076,185 A | * | 2/1978 | Dorph | A01K 89/0111 242/118.41 |
| 4,535,953 A | * | 8/1985 | Omori | A01K 89/01 242/241 |
| 5,120,003 A | * | 6/1992 | Sacconi | A01K 89/01931 242/317 |
| 5,195,699 A | * | 3/1993 | Stinnette | A01K 89/0111 242/118.6 |
| 5,370,331 A | | 12/1994 | Sato | |
| 5,558,290 A | | 9/1996 | Sato | |
| 5,607,114 A | * | 3/1997 | Henriksson | A01K 89/027 242/244 |
| 5,906,329 A | * | 5/1999 | Wesley, Sr. | A01K 89/003 242/390.8 |
| 5,911,378 A | * | 6/1999 | Plestan | A01K 89/0111 242/231 |
| 6,015,111 A | * | 1/2000 | Berke | A01K 89/003 242/250 |
| 6,032,894 A | | 3/2000 | Chapman et al. | |

(Continued)

*Primary Examiner* — Emmanuel M Marcelo
(74) *Attorney, Agent, or Firm* — Cramer Patent & Design, PLLC; Aaron R. Cramer

(57) ABSTRACT

An open face fishing reel utilizes a quick-release spool device having a modular reel component that facilitates the interchanging of fishing line while the reel is still secured within the fishing reel housing and crank mechanism. The device is configured to be removably replaced with a different spool having a new unit of fishing line secured thereabout.

19 Claims, 5 Drawing Sheets

(56) References Cited

U.S. PATENT DOCUMENTS

| | | | |
|---|---|---|---|
| 6,712,300 B2* | 3/2004 | Carlebach | A01K 89/0111 |
| | | | 242/318 |
| 8,662,434 B2* | 3/2014 | Triller | A01K 89/0162 |
| | | | 242/317 |
| 8,840,054 B2 | 9/2014 | Maerz et al. | |
| 9,072,284 B2 | 7/2015 | Hyun | |
| 9,480,246 B1* | 11/2016 | Carlebach | A01K 89/0113 |
| 9,615,555 B2 | 4/2017 | Ikebukuro | |
| 2006/0163403 A1* | 7/2006 | Dickson | A01K 89/0192 |
| | | | 242/323 |
| 2007/0246590 A1 | 10/2007 | Hyun | |

* cited by examiner

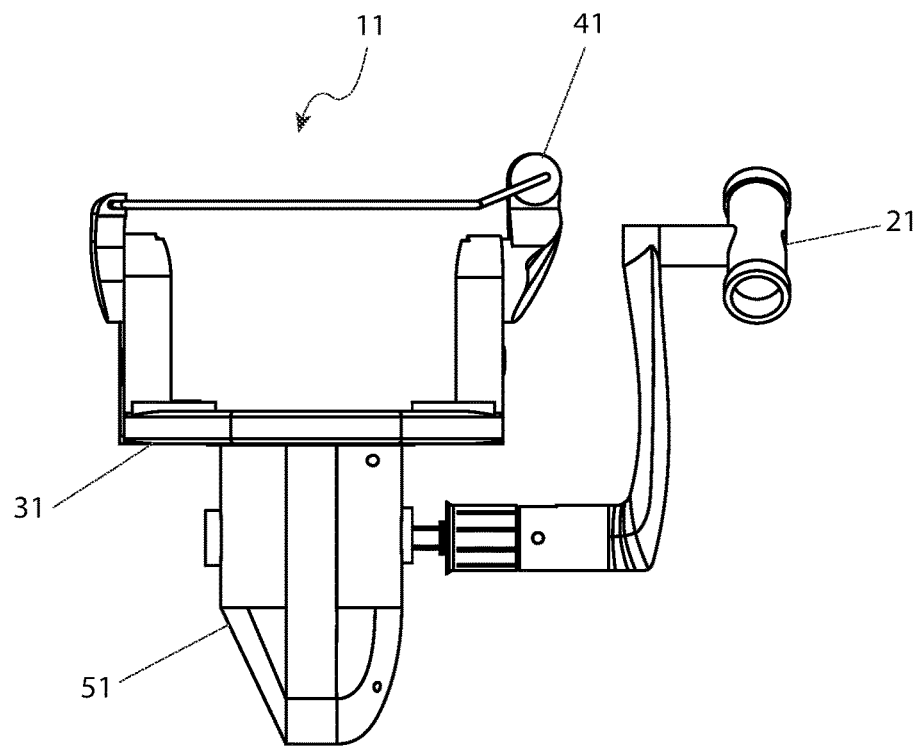
FIG. 2a
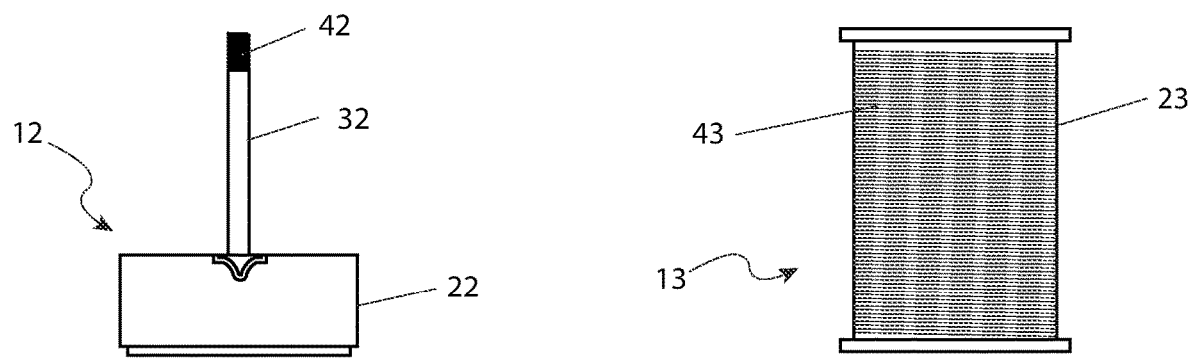
FIG. 2b
FIG. 2c

OPEN FACE FISHING REEL WITH QUICK-RELEASE SPOOL

RELATED APPLICATIONS

The present invention claims the benefit of U.S. Provisional Application No. 62/679,394 filed on Jun. 1, 2018, the entire disclosures of which are incorporated herein by reference.

FIELD OF THE INVENTION

The present invention relates to a fishing reel having a quick-change spool mechanism for an open face fishing reel.

BACKGROUND OF THE INVENTION

The technology used by anglers to catch fish has become increasingly complex in nature. Fishermen no longer rely on the traditional hook and worm approach to attract their game. Instead, a broad range of products have hit the market, designed to aid the fisherman to catch more fish quickly. As would be suspected, the fishing rod, reel, and line are the primary participants in a successful fishing outing.

Many times, it is necessary to use different strengths and styles of line necessitating removal of the line and a rewinding of new line. Such tasks are difficult, time consuming, and frequently generate a wad of wasted line that is not only costly but generates environmental issues should it not be properly disposed. Accordingly, there exists a need for a means by which fishing line can be easily interchanged on a reel without the disadvantages as described above. The development of the open face fishing reel with a quick release spool allows fishermen the ability the ability to install different fishing line onto a reel in a manner which is quick, easy, and effective.

SUMMARY OF THE INVENTION

The inventor has recognized the aforementioned inherent problems and lack in the art and observed that there is a need for a reel comprising a spool released for threading a new fishing line that is reassembled onto the reel. The spool includes a spinning reel spool base supporting a centrally attached and vertically extending spinning reel spool shaft. At the terminal end of the spinning reel spool shaft opposite the spinning reel spool base is a fastener. The reel also comprises a fishing line carriage removably placed on the spinning reel spool. The fishing line carriage incorporates a fishing line carriage body and is capable of having a fishing line wound thereon and a spinning reel drag. The fishing line carriage body has an internal bore to enable passage of the spinning reel spool shaft to enable the fishing line carriage to be supported on the spinning reel spool. The reel also comprises a spinning reel frame having a spinning reel spool seat, a bail, and a handle attached to the spinning reel frame. The spinning reel frame is mechanically attached to and driving the spool and the fishing line carriage when those elements are placed on the spinning reel seat. The reel also comprises a drag housing containing a plurality of internal components, which provides drag for the fishing line carriage body.

The spool may be released for threading the new fishing line that is for removal so that another pre-loaded spool replaces the spent spool. The fastener may be a plurality of external threads. The spinning reel spool base may have a geometrical shape enabling proper support on and retention on the spinning reel spool seat of the spinning reel. The geometrical shape may be circular. A charter reel spool may be removably attached to a charter reel frame. The fishing line carriage may be cylindrical and may have a circular cross-section. The spinning reel drag may be removably attached to the fastener of the spinning reel spool to retain the fishing line carriage.

The spinning reel spool resides upon the spinning reel and provides a drag resistance to the fishing line when it is deployed. The fishing line carriage body may have an internal bore to enable passage of the spinning reel spool shaft to enable the fishing line carriage to be supported on the spinning reel spool. The fishing line may be adjusted by turning a drag adjustment knob in a clockwise rotational travel path. The fishing line may also be adjusted by turning a drag adjustment knob in a counterclockwise rotational travel path. The attachment knob may hold the drag housing and the drag adjustment knob firmly in place regardless of the drag introduced onto the fishing line carriage.

Manipulation of the drag adjustment knob may introduce friction between a first drag plate and a second drag plate. The friction may inhibit motion between the drag housing and the fishing line carriage. The action of the drag adjustment knob may be generated by action by the drag adjustment knob working against a second threaded surface on the spinning reel spool shaft. The drag housing may be removed by loosening the attachment knob, removing the drag housing, and then lifting away the fishing line carriage body complete with the fishing line and rapid replacement then occurs followed by replacement of the drag housing. The reel may be useful when carrying a plurality of pre-loaded spools with different pound tests of fishing line for quick and easy replacement. The reel may be a fly rod reel having a fly rod reel spool removably attached to a fly rod reel frame.

Further advantages of the present disclosure will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 2a is a front elevation view of a spinning reel frame 11, according to a preferred embodiment of the present invention;

FIG. 2b is a front elevation view of an unloaded spinning reel spool 12, according to a preferred embodiment of the present invention;

FIG. 2c is a front elevation view of a loaded spinning reel spool 12, according to a preferred embodiment of the present invention;

Figure 1:
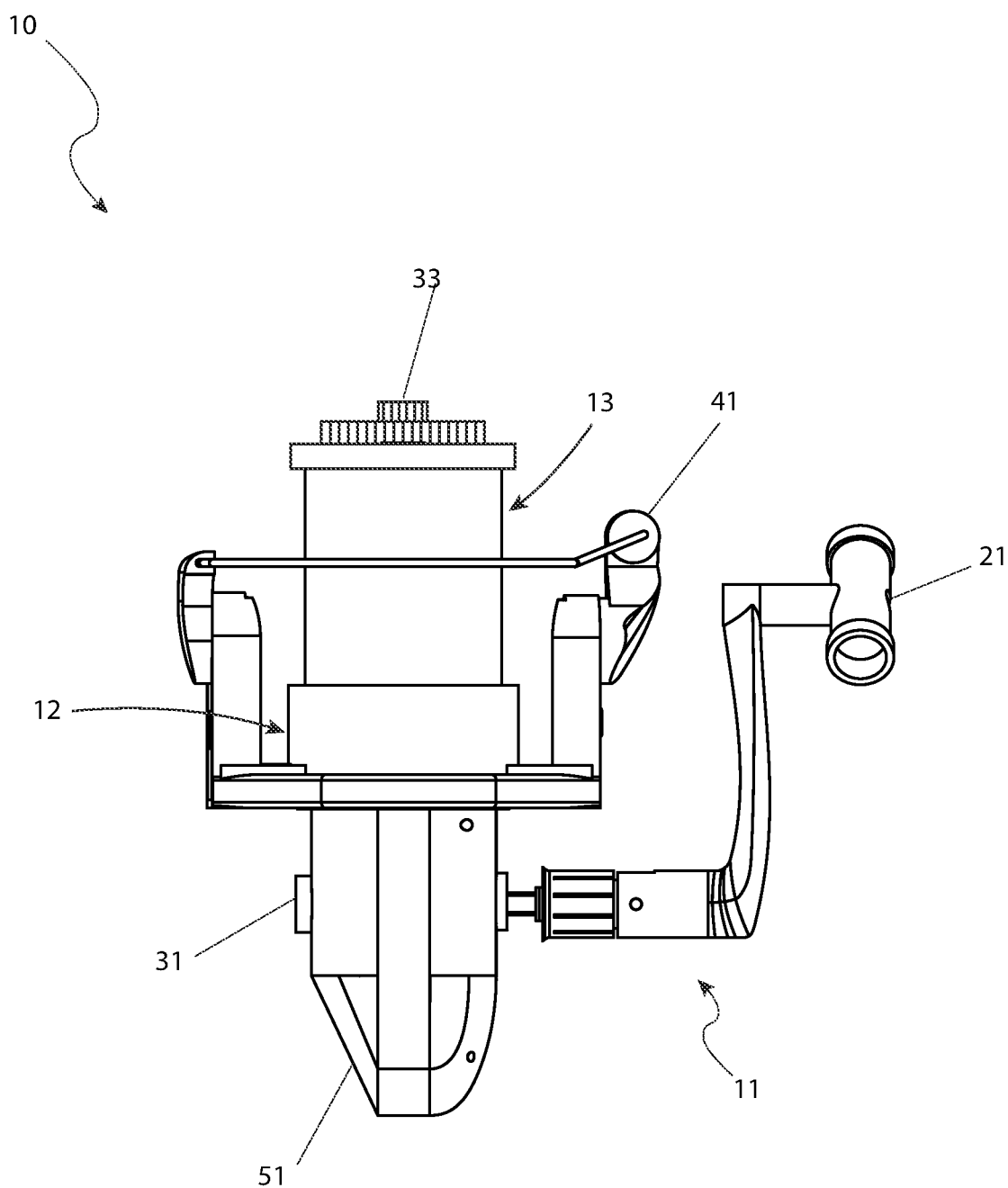
FIG. 1 is a front elevation view of a quick-release spool 10, according to a preferred embodiment of the present invention.

DESCRIPTIVE KEY 10 quick-release spool
11 spinning reel
12 spinning reel spool
13 fishing line carriage
21 spinning reel handle
22 spinning reel spool base
23 fishing line carriage body
31 spinning reel spool seat
32 spinning reel spool shaft
33 drag
41 bail
42 fastener
43 fishing line
51 spinning reel frame
100 charter reel
101 charter reel frame
114 charter reel spool
200 fly rod reel
201 fly rod reel frame
214 fly rod reel spool
250 drag housing
255 attachment knob
260 drag adjustment knob
265 rotational travel path "r"
270 first drag plate
275 second drag plate
280 second threaded surface

1. DESCRIPTION OF THE INVENTION

Figure 3:
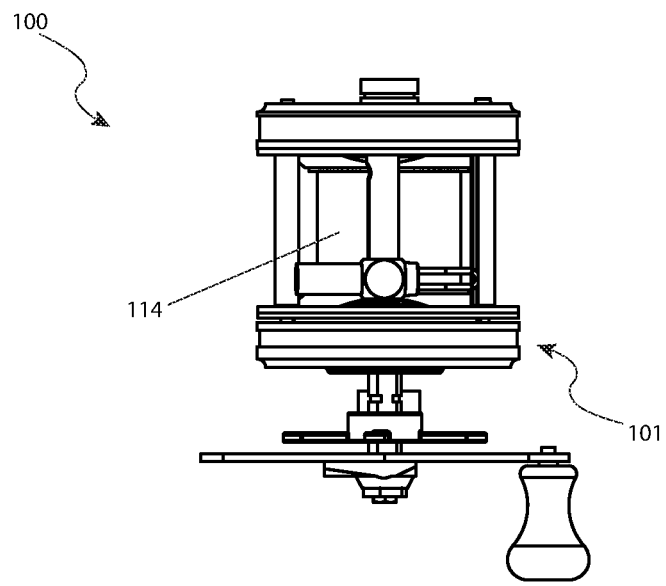
FIG. 3 is a front elevation view of a charter reel 100, according to an alternate embodiment of the present invention.

The best mode for carrying out the invention is presented in terms of its preferred embodiment, herein depicted within FIG. 1, and alternately within FIGS. 2 and 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

The invention 10 generally relates to a spinning reel 11 or other type of reel 100, 200 that incorporates a spool 12, 114, 214, able to be quickly released for threading new fishing line 43 and reassembly onto the reel 11, 100, 200, or for removal so that another, fully pre-loaded spool 12, 114, 214 can replace the spent spool 12, 114, 214. The invention 10 is very useful when carrying pre-loaded spools 12, 114, 214 with different pound tests of fishing line 43 for quick and easy replacement. It is also a benefit to the environment, in that extraneous fishing line 43 is not wasted on threading the spool 12, 114, 214, which is commonly cut and due to it being done on site, ends up as waste on decks, piers, or shore where it can become a hazard to the wildlife.

FIGS. 1-2c illustrates a preferred embodiment of the invention 10, fashioned as a spinning reel 11. A spinning reel spool 12 is removably placed on the spinning reel 11. A fishing line carriage 31 is removably placed on the spinning reel spool 12. The spinning reel 11 incorporates commonly associated features, such as a spinning reel frame 51 with a spinning reel spool seat 31, a bail 41, and a handle attached to the spinning reel frame 51 and mechanically attached to and driving the spinning reel spool 12 and fishing line carriage 13 when those elements are placed on the spinning reel seat 31. Other items, such as a support arm that is attached to the spinning reel frame 51, and a foot that is attached to the support arm at one (1) end and the fishing rod at the other, are assumed to be present, although not illustrated herein.

The spinning reel spool 12 incorporates common features such as a spinning reel spool base 22, supporting a centrally attached and vertically extending spinning reel spool shaft 32. At the terminal end of the spinning reel spool shaft 32, opposite the spinning reel spool base 22, is a fastener 42, which is preferably external threads. The spinning reel spool base 22 has a geometrical shape enabling proper support on and retention on the spinning reel spool seat 31 of the spinning reel 11. Preferably, this shape is circular. The fishing line carriage 13 incorporates a fishing line carriage body 23, preferably cylindrical and having a circular cross-section and is capable of having fishing line 43 wound thereon. The fishing line carriage body 23 has an internal bore to enable passage of the spinning reel spool shaft 32 to enable the fishing line carriage 13 to be supported on the spinning reel spool 12. The fishing line carriage body 23 is removably attached to the fastener 42 of the spinning reel spool 12 to retain the fishing line carriage 13 and spinning reel spool 12 on the spinning reel 11 and provides a drag resistance to the fishing line 43 when it is deployed.

Figure 4:
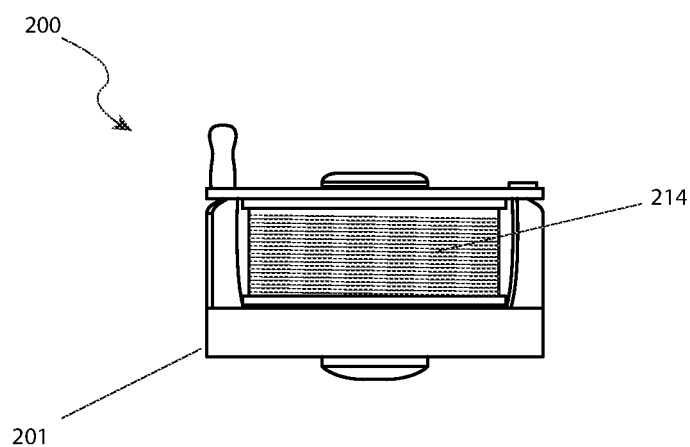
FIG. 4 is a front elevation view of a flyrod reel 200, according to another alternate embodiment of the present invention.

FIG. 3 illustrates an alternate embodiment, in which the invention 10 is provided as a charter reel 100, having a charter reel spool 114 removably attached to a charter reel frame 101. FIG. 4 illustrates another alternate embodiment, in which the invention 10 is provided as a fly rod reel 200, having a fly rod reel spool 214 removably attached to a fly rod reel frame 201. With the charter reel 100 and the fly rod reel 200, the lid would have to be removed before the new spool 114, 214 is placed within the respective frame 101, 201.

Figure 5:
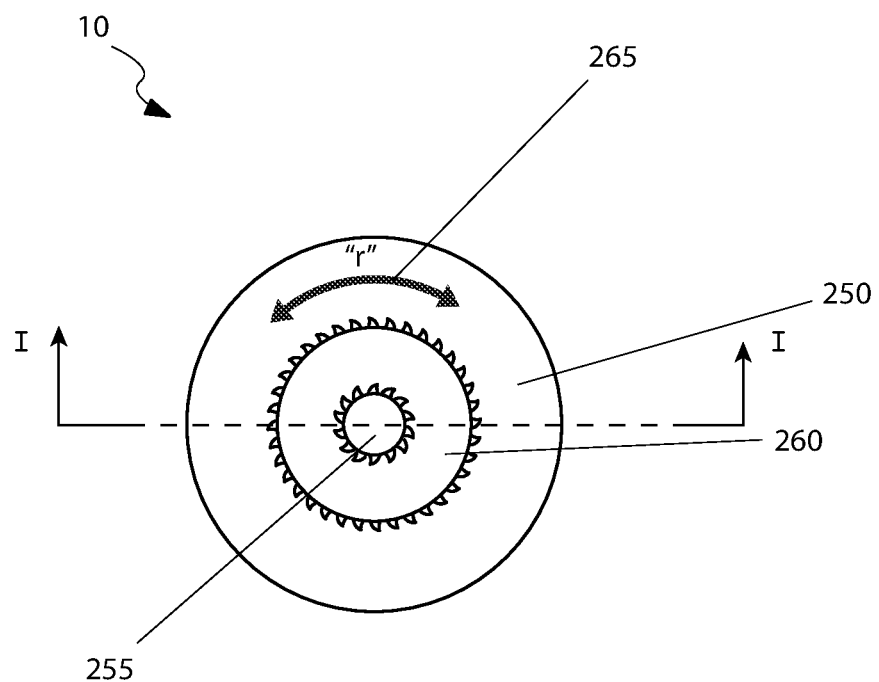
FIG. 5 is a top elevation view of the drag 33 as used with the quick-release spool 10, according to the preferred embodiment of the present invention, and, FIG. 6 is a sectional view of the drag 33 as seen along a line I-I, as shown in FIG. 5, according to the preferred embodiment of the present invention.

Referring now to FIG. 5, a top elevation view of the drag 33 as used with the quick-release spool 10, according to the preferred embodiment of the present invention is disclosed. A drag housing 250 contains internal components which provides drag for the fishing line carriage body 23 (as shown in FIG. 2c) and will be described in greater detail herein below. The drag housing 250 is held captive to the spinning reel spool shaft 32 by a knurled attachment knob 255 which tightens down on the fastener 42 (as shown in FIG. 2b). Adjustment of the drag on the fishing line 43 (as shown in FIG. 2c) is made by turning a drag adjustment knob 260 in either a clockwise or counterclockwise rotational travel path "r" 265.

Figure 6:
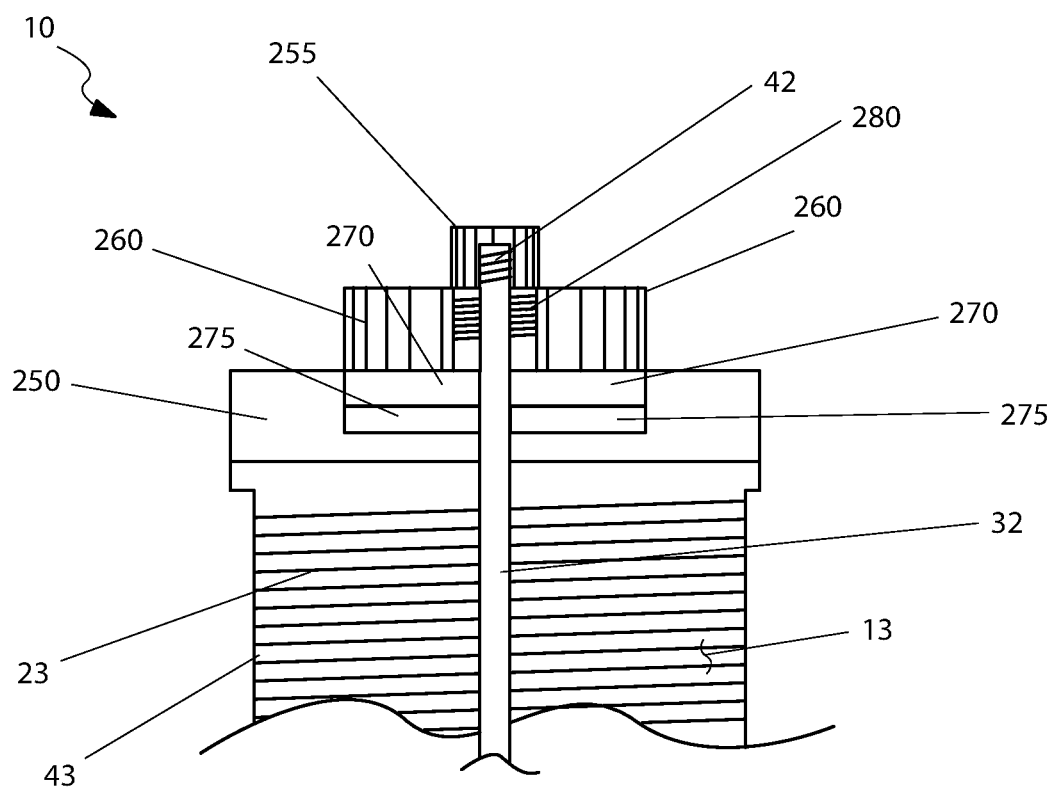

Referring to FIG. 6 is a sectional view of the drag 33 as seen along a line I-I, as shown in FIG. 5, according to the preferred embodiment of the present invention. Such a view provides clarification on the relationship between the drag housing 250 and the fishing line carriage 13. The attachment knob 255 holds the drag housing 250 and the drag adjustment knob 260 firmly in place no matter the drag introduced onto the fishing line carriage 13. Manipulation of the drag adjustment knob 260 introduces friction between a first drag plate 270 and a second drag plate 275. The friction inhibits motion between the drag housing 250 and the fishing line carriage 13. The action of the drag adjustment knob 26 is generated by action by the drag adjustment knob 260 working against a second threaded surface 280 on the spinning reel spool shaft 32. The relationship allows the drag housing 250 to be removed by loosening the attachment knob 255, removing the drag housing 250, and then lifting away the fishing line carriage body 23 complete with the fishing line 43. Rapid replacement may then occur followed by replacement of the drag housing 250.

The invention claimed is:

1. A reel, comprising:
    a spool released for threading a new fishing line that is reassembled onto the reel, the spool includes a spinning reel spool base supporting a centrally attached and axially extending spinning reel spool shaft, at a terminal end of the spinning reel spool shaft opposite the spinning reel spool base is a fastener;
    a fishing line carriage removably placed on the spinning reel spool, the fishing line carriage incorporates a fishing line carriage body and is capable of having a fishing line wound thereon and a spinning reel drag, the fishing line carriage body has an internal bore to enable passage of the spinning reel spool shaft to enable the fishing line carriage to be supported on the spinning reel spool;
    a spinning reel frame having a spinning reel spool seat, a bail, and a handle attached to the spinning reel frame, the spinning reel frame is mechanically attached to and driving the spool and the fishing line carriage when those elements are placed on the spinning reel seat;
    a drag housing containing a plurality of internal components, which provides drag for the fishing line carriage body; and,
    wherein the action of a drag adjustment knob is generated by action by the drag adjustment knob working against a second threaded surface on the spinning reel spool shaft.

2. The reel according to claim 1, wherein the spool released for threading the new fishing line that is for removal so that another pre-loaded spool replaces a spent spool.

3. The reel according to claim 1, wherein the fastener is a plurality of external threads.

4. The reel according to claim 1, wherein the spinning reel spool base has a geometrical shape enabling proper support on and retention on the spinning reel spool seat of the spinning reel.

5. The reel according to claim 4, wherein the geometrical shape is circular.

6. The reel according to claim 1, wherein a charter reel spool is removably attached to a charter reel frame.

7. The reel according to claim 1, wherein the fishing line carriage is cylindrical.

8. The reel according to claim 1, wherein the fishing line carriage has a circular cross-section.

9. The reel according to claim 8, wherein the spinning reel drag is removably attached to the fastener of the spinning reel spool to retain the fishing line carriage.

10. The reel according to claim 1, wherein the spinning reel spool resides upon the spinning reel and provides a drag resistance to the fishing line when it is deployed.

11. The reel according to claim 1, wherein the fishing line carriage body has an internal bore to enable passage of the spinning reel spool shaft to enable the fishing line carriage to be supported on the spinning reel spool.

12. The reel according to claim 1, wherein the fishing line is adjusted by turning the drag adjustment knob in a clockwise rotational travel path.

13. The reel according to claim 12, wherein the fishing line is adjusted by turning the drag adjustment knob in a counterclockwise rotational travel path.

14. The reel according to claim 1, wherein a attachment knob holds the drag housing and the drag adjustment knob firmly in place regardless of the drag introduced onto the fishing line carriage.

15. The reel according to claim 1, wherein manipulation of the drag adjustment knob introduces friction between a first drag plate and a second drag plate.

16. The reel according to claim 15, wherein the friction inhibits motion between the drag housing and the fishing line carriage.

17. The reel according to claim 1, wherein the drag housing is removed by loosening the attachment knob, removing the drag housing, and then lifting away the fishing line carriage body complete with the fishing line and rapid replacement then occurs followed by replacement of the drag housing.

18. The reel according to claim 1, wherein the reel is useful when carrying a plurality of pre-loaded spools with different pound tests of fishing line for quick and easy replacement.

19. The reel according to claim 1, wherein the reel is a fly rod reel having a fly rod reel spool removably attached to a fly rod reel frame.

* * * * *